Nov. 14, 1967 H. VISSERS 3,352,366
MACHINES FOR CULTIVATING THE SOIL
Filed Oct. 6, 1964 2 Sheets-Sheet 1
FIG.1
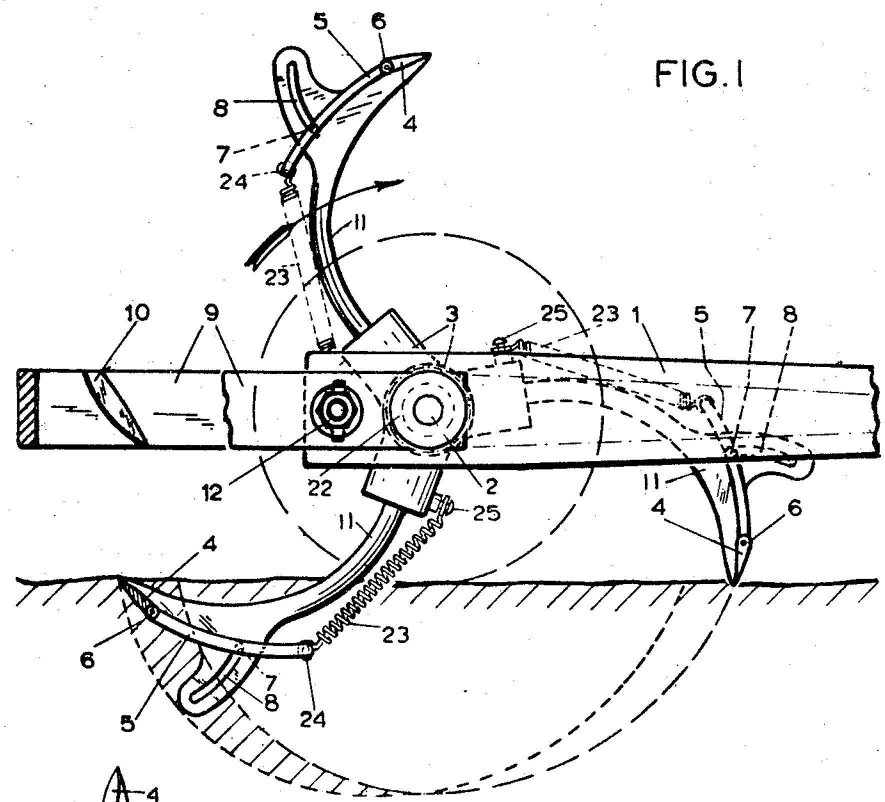
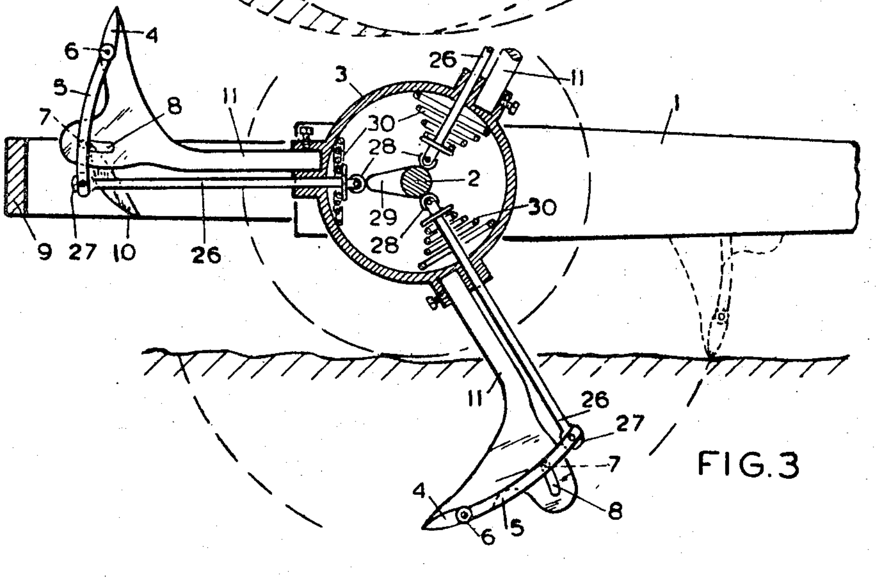
FIG.3
INVENTOR
HERBERT VISSERS
BY
Imirie & Smiley
ATTORNEYS Nov. 14, 1967 H. VISSERS 3,352,366

MACHINES FOR CULTIVATING THE SOIL

Filed Oct. 6, 1964 2 Sheets-Sheet 2

INVENTOR

HERBERT VISSERS

BY [signature]

ATTORNEYS

United States Patent Office 3,352,366 Patented Nov. 14, 1967

1

3,352,366
MACHINES FOR CULTIVATING THE SOIL

Herbert Vissers, Nieuw-Vennep, Netherlands, assignor to Landbouwwerktuigen- en Machinefabriek H. Vissers N.V., Nieuw-Vennep, Netherlands, a company of the Netherlands Filed Oct. 6, 1964, Ser. No. 401,846
7 Claims. (Cl. 172—94)

ABSTRACT OF THE DISCLOSURE

The invention relates to a machine for cultivating the soil provided with digging blades arranged in one or more circular sets side by side and by means of arms being connected to a horizontal shaft, said shaft being supported in a travelling frame and only the foremost part of each blade provided with a cutting edge being rigidly secured to its arm and the remaining part of the blade being movable with respect to said fixed part.

*Background of invention*

The usual rotary cultivator has rigid digging blades which tend to dump the slices of soil as they are lifted from the earth in an irregular manner so that the vegetation on the soil surface is predominantly exposed rather than turned under. This requires a plurality of passes over the ground to break up the slices or clods and bury the vegetation so that it can serve as green manure. Auxiliary devices have been proposed for assisting in the removal of the slices from the blades but these are in the nature of scrapers or cleaners and tend to remove the slices with the vegetation side up.

*Summary of invention*

The invention has for its object to improve an arrangement of this kind in such a manner that the slices of soil cut off and taken up by the digging blades are regularly released from the blades when coming above the ground in such a manner that the vegetation is turned under. According to the invention the movable part of the digging blade is pivoted to the fixed foremost part of the blade and an abutment being provided at the frame for cooperation with the pivotal part of the blades in such a manner that said part of the blade is pivoted for releasing the slice of soil taken up by the blade. As upon abutting against the abutment the pivotal part of the blade will pivot more rapidly the slice of soil on the blade due to its inertia will stay behind to some degree with respect to the pivoting blade and, therefore, become free from the blade, so that the varying frictional resistance encountered by the slice of soil on the blade in its position for releasing the slice is practically eliminated. For adjusting the moment of releasing the slice of soil from the pivotal blade the abutment cooperating with said pivotal blade may be adjustable in vertical direction.

Also means may be provided for locking the pivotal blade when the blade penetrates into the ground and allowing the blade to pivot in its position for releasing the slice of soil taken up. The pivoted blade may thereby be locked in such a manner that the blade when penetrating into the ground exerts a backward pressure on the slice of soil to be cut off and at its rear side is free from the soil not yet cut. The slice of soil will, therefore, break off along the prolongation of the cut made by the cutting edge of the blade and the pores at the surface of rupture will not be closed, so that the surface of the slice retains its porosity.

2

*Brief description of drawings*

The invention will further be described with reference to the accompanying drawings showing two embodiments of the machine according to the invention.

In the drawing FIG. 1 is an elevation of a machine embodying the invention with a part in longitudinal section along the line I—I in FIG. 2, which is a partial plan view of the machine.

FIG. 3 is a longitudinal section of a circular set of blades provided with locking means for the pivotal blades of modified construction.

*Detailed description*

Figure 2:
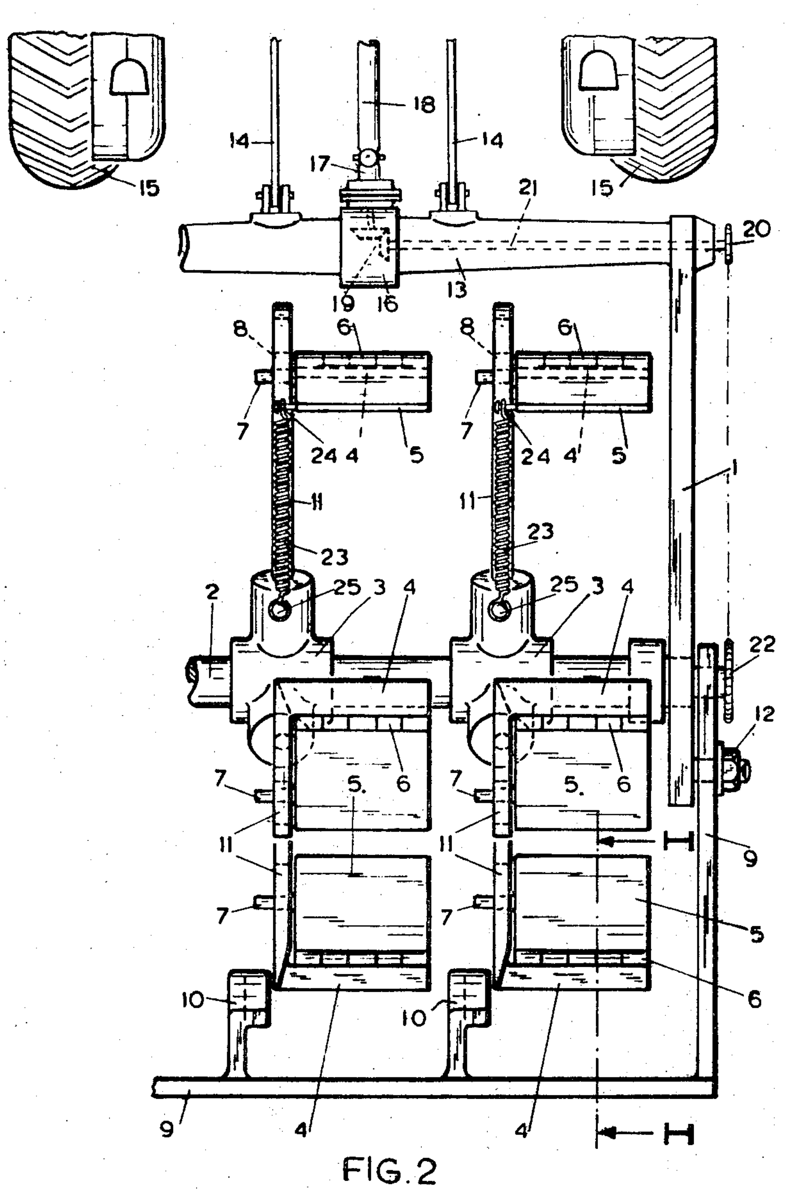

The shaft 2 is rotatably supported in the cheeks 1 of the frame rigidly connected to a transverse beam 13. Said beam 13 by means of links 14 is attached to a tractor 15 and comprises a gear box 16 having its input shaft 17 connected to the coupling shaft 18 of the tractor. The rotation of the input shaft 17 by a toothed gear 19 located in box 16 is transmitted to a sprocket 20 secured on a shaft 21 extending in the hollow beam 13. Sprocket 20 by a chain transmits its rotation to a sprocket 22 secured at the end of shaft 2. One or more hub bodies 3 are secured on shaft 2 and each are provided with a number of arms, e.g., three arms 11. Each of said arms 11 carry a digging element having its foremost part 4 forming a cutting edge rigidly secured to the arm and having its rear part 5 forming the blade proper connected to the fixed part by 4 by a hinge 6, so that part 5 is adapted to pivot with respect to part 4. A stud 7 projecting from the pivotal blade 5 extends into a slot 8 in the arm 11, so that the pivoting movement of the blade is limited in both directions. In order to secure the blade 5 to be pivoted to its extreme position for releasing the slice of soil taken up by the blade an abutment 10 is provided on an auxiliary frame 9 against which the stud 7 of the blade abuts. The auxiliary frame 9 is supported at the ends of shaft 2 so that the frame may vertically be adjusted and locked in its adjusted position by means of a clamping bolt 12. When adjusting frame 9 the abutment 10 rotates about the axis of shaft 2 so that the position of the abutment with respect to the stud 7 extending from the digging blade 5 is not influenced by the vertical adjustment but said stud 7 only contacts the abutment 10 at an earlier or later moment during the rotation of shaft 2.

With the embodiment shown in FIGS. 1 and 2 each blade 5 is provided with a draw-spring 23 having its one end connected at 24 to the rear end of the blade and its other end at 25 to the hub body 3. Said spring tends to draw the pivotal blade 5 with its stud 7 towards the inner end of the slot 8 and holds the blade in this position also when the blade penetrates into the ground provided that the force exerted by the spring 23 on the blade exceeds the forwards directed pressure of the soil on the blade.

With the embodiment shown in FIG. 3 the axle 2 is stationary and its ends are secured in the cheeks 1 of the frame. The hub body 3 to which the arms 11 of the blades are secured forms part of a hollow shaft which by means of bearings, not shown, is rotatably supported on the stationary axle 2. Rotation of the hub body 3 is obtained by a drive similar to that shown in FIGS. 1 and 2. Each blade 5 is provided with a rod 26 having one end pivotally connected to the blade 5 at 27 and at its other end carrying a roller 28 adapted to cooperate with a cam 29 on the stationary axle 2. Each rod 26 is slidably guided in the circumferential wall of the hub body 3 and provided with a spring 30 tending to urge the blade with its stud 7 towards the inner end of slot 8 and holding the blade in said position also when the blade penetrates into the ground. When the blade with its roller 28 reaches the active part of cam 29 the rod 26 urges the blade with its stud 7 towards the outer end of slot 8 against the pressure of the spring 30 to the position of the blade for releasing the slice of soil taken up.

What I claim is:

1. In a rotary cultivator including a frame rotatably supporting a horizontal shaft having a plurality of arms extending generally radially therefrom and carrying digging blades on their free ends, the improvement wherein each said blade comprises a forward cutting edge part rigid with the respective arm and a rear blade part separate from said forward part, means pivotally mounting the forward edge portion of said rear blade part to the rear edge portion of said forward cutting edge part, means connected with said rear part and normally retaining said rear part in an operative position wherein its blade surface is contiguous with the cutting edge surface of said forward part and constitutes in combination the digging blade, and means operative as each blade lifts from the earth to swing said rear part from said operative position to separate said part from the slice of soil dug up by said blade and cause the slice to dump from the rear of the blade.

2. A cultivator according to claim 1 wherein said retaining means comprises spring means biasing said rear part to operative position.

3. A cultivator according to claim 2 comprising means limiting the movement of said rear part to both its operative and dumping positions.

4. A cultivator according to claim 3 wherein said limiting means comprises a stud on said rear part, and said arm being provided with a slot into which said stud extends.

5. A cultivator according to claim 4 wherein said spring means comprises a spring connected between said rear part and the respective arm, and said rear part swinging means comprises a cam on said frame in the path of said stud to be abutted thereby.

6. A cultivator according to claim 5 wherein said frame comprises a main portion rotatable supporting said shaft, and an auxiliary portion carrying said cam and pivotally mounted on said shaft, and clamp means between said frame portions for clamping said auxiliary frame in selected angular relation to said main frame for positioning said cam in selected position in relation to the path of said stud and the relative angle of each blade to ground surface.

7. A cultivator according to claim 4 wherein said shaft is hollow and is rotatably mounted on an axle stationarily mounted on said frame, said blade retaining means comprising a rod pivotally connected at one end to said rear part and having its other end portion slidably mounted radially into said shaft, said spring means being interposed between the inner end of said rod and the inner wall of said shaft and biasing said rod inwardly, and said rear part swinging means comprising a cam on said axle and disposed in the path of the inner end of said rod for pushing said rod outwardly as the latter passes said cam.

References Cited

UNITED STATES PATENTS

| | | | |
|---|---|---|---|
| 300,413 | 6/1884 | Turchin | 172—94 |
| 2,489,516 | 11/1949 | Booth | 172—94 X |

FOREIGN PATENTS

| | | | |
|---|---|---|---|
| 59,951 | 7/1913 | Austria. | |

ABRAHAM G. STONE, *Primary Examiner.*

WILLIAM A. SMITH III, *Examiner.*

J. R. OAKS, *Assistant Examiner.*